(12) United States Patent
Kurokawa et al.

(10) Patent No.: US 12,065,154 B2
(45) Date of Patent: Aug. 20, 2024

(54) VEHICLE CONTROL SYSTEM

(71) Applicant: Mazda Motor Corporation, Hiroshima (JP)

(72) Inventors: Yoshimasa Kurokawa, Hiroshima (JP); Tetsuhiro Yamashita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 230 days.

(21) Appl. No.: 17/630,930

(22) PCT Filed: Jul. 17, 2020

(86) PCT No.: PCT/JP2020/027852
§ 371 (c)(1),
(2) Date: Jan. 28, 2022

(87) PCT Pub. No.: WO2021/020172
PCT Pub. Date: Feb. 4, 2021

(65) Prior Publication Data
US 2022/0274609 A1    Sep. 1, 2022

(30) Foreign Application Priority Data
Jul. 30, 2019    (JP) ................................ 2019-140267

(51) Int. Cl.
*B60W 10/04*    (2006.01)
*B60R 16/023*    (2006.01)
(Continued)

(52) U.S. Cl.
CPC ..... *B60W 50/0205* (2013.01); *B60R 16/0232* (2013.01); *B60W 10/04* (2013.01);
(Continued)

(58) Field of Classification Search
CPC .. B60W 50/0205; B60W 10/04; B60W 10/18; B60W 10/20; B60W 50/029;
(Continued)

(56) References Cited

U.S. PATENT DOCUMENTS

2004/0016594 A1*  1/2004  Yasui ..................... B62D 6/04
                                                              180/446
2004/0104701 A1*  6/2004  Ohshima .............. H02H 7/0851
                                                              318/434
(Continued)

FOREIGN PATENT DOCUMENTS

JP    2000-64685 A      2/2000
JP    2000064685 A  *  2/2000
(Continued)

OTHER PUBLICATIONS

International Search Report and Written Opinion mailed on Oct. 6, 2020, received for PCT Application PCT/JP2020/027852, Filed on Jul. 17, 2020, 11 pages including English Translation.

*Primary Examiner* — Adam D Tissot
*Assistant Examiner* — Jean W Charleston
(74) *Attorney, Agent, or Firm* — XSENSUS LLP

(57) ABSTRACT

A vehicle control system includes a central ECU configured to calculate target outputs of actuators, and relay devices each disposed in a communication path between the central ECU and a corresponding actuator among the actuators. The plurality of relay devices includes a specific relay device configured transfer a control signal from the central ECU only to a fixed actuator that is an actuator not related to driving control, braking control, and steering control of a vehicle. The specific relay device is configured to output, to the fixed actuator coupled to the specific relay device, one of a signal for setting the fixed actuator in an operating state or a signal for setting the fixed actuator in a non-operating state, in response to detection of an abnormality in the
(Continued)

central ECU. The specific relay device does not have a function of diagnosing an abnormality in the specific relay device.

6 Claims, 4 Drawing Sheets

(51) Int. Cl.
 *B60W 10/18* (2012.01)
 *B60W 10/20* (2006.01)
 *B60W 50/02* (2012.01)
 *B60Q 1/04* (2006.01)

(52) U.S. Cl.
 CPC ............ *B60W 10/18* (2013.01); *B60W 10/20* (2013.01); *B60Q 1/04* (2013.01)

(58) Field of Classification Search
 CPC . B60W 2050/0295; B60W 2050/0297; B60W 50/02; B60R 16/0232; B60Q 1/04; B60Q 11/005; G06F 11/0739; G06F 11/0796
 USPC .......................................................... 701/32
 See application file for complete search history.

(56) References Cited

U.S. PATENT DOCUMENTS

| | | | |
|---|---|---|---|
| 2005/0159876 A1* | 7/2005 | Sugano | B60W 10/184 701/41 |
| 2005/0205339 A1* | 9/2005 | Aizawa | B60W 30/045 180/443 |
| 2006/0015231 A1 | 1/2006 | Yoshimura et al. | |
| 2007/0201843 A1* | 8/2007 | Takahashi | H02H 7/0851 388/806 |
| 2010/0030421 A1 | 2/2010 | Yoshimura et al. | |
| 2013/0015797 A1 | 1/2013 | Itou | |
| 2014/0188343 A1 | 7/2014 | Yoshimura et al. | |
| 2015/0100207 A1 | 4/2015 | Yoshimura et al. | |
| 2016/0347326 A1* | 12/2016 | Iwagami | B60W 10/06 |
| 2018/0268695 A1* | 9/2018 | Agnew | B60K 28/066 |
| 2019/0182267 A1 | 6/2019 | Aher et al. | |
| 2020/0047713 A1* | 2/2020 | Ohi | B60R 25/241 |

FOREIGN PATENT DOCUMENTS

| | | | |
|---|---|---|---|
| JP | 2010-111356 A | | 5/2010 |
| JP | 2010111356 A | * | 5/2010 |
| JP | 2014-39085 A | | 2/2014 |
| JP | 2014039085 A | * | 2/2014 |
| JP | 2016-196295 A | | 11/2016 |

* cited by examiner

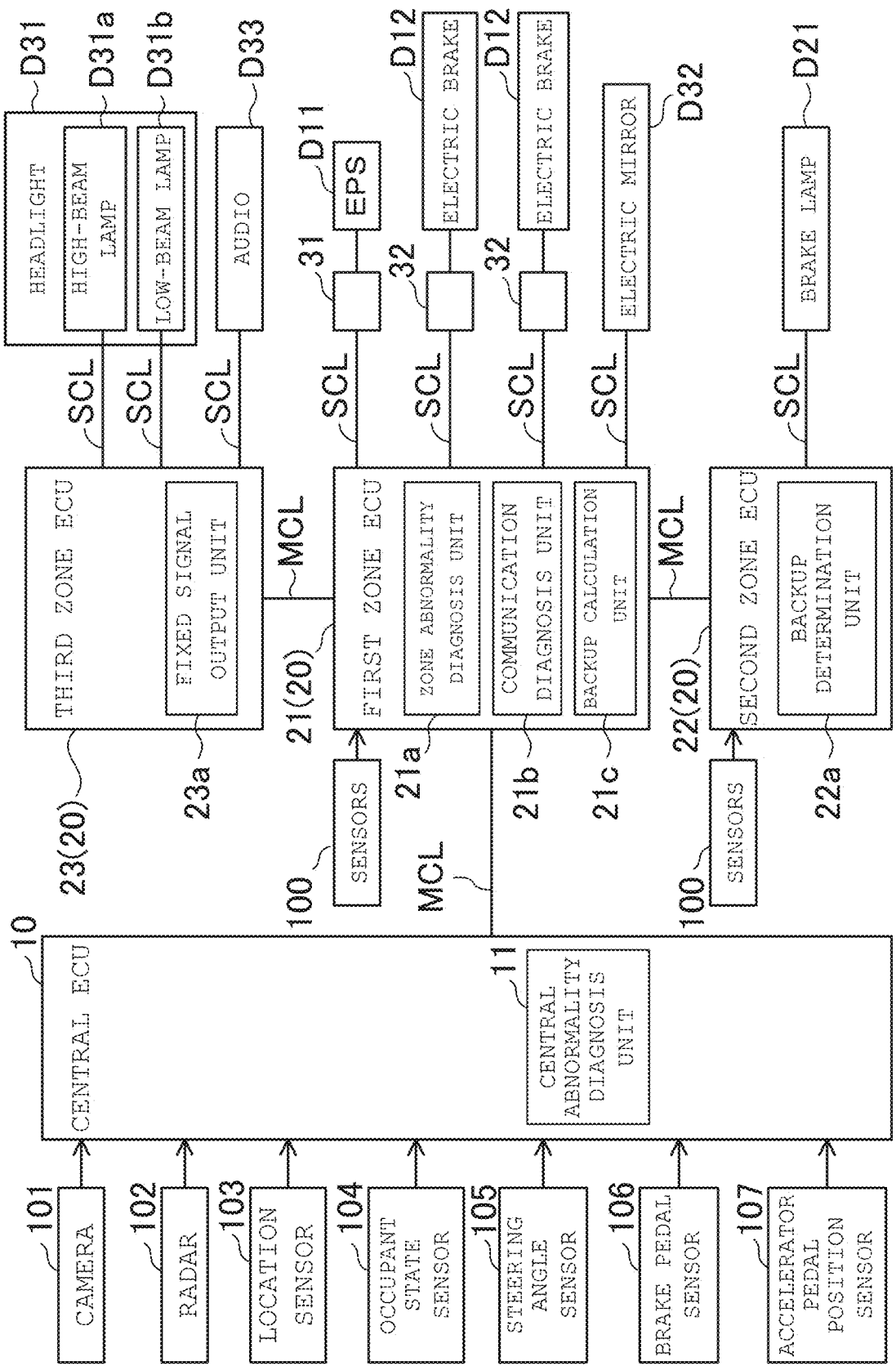

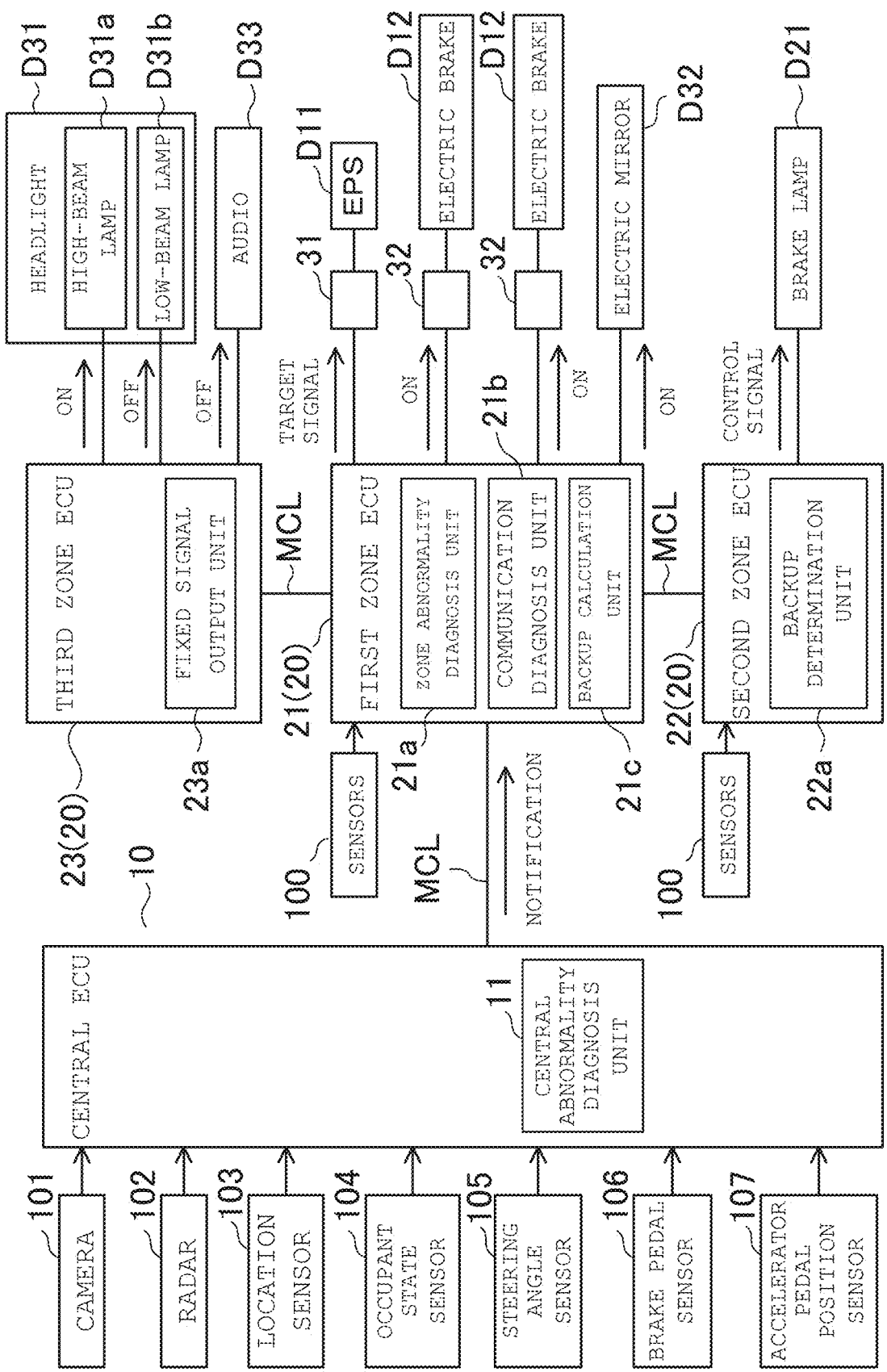

VEHICLE CONTROL SYSTEM

CROSS-REFERENCE TO RELATED APPLICATIONS

The present application is based on PCT/JP2020/027852 filed on Jul. 17, 2020, and claims priority to Japanese Application No. 2019-140267 filed on Jul. 30, 2019, the entire contents of each are incorporated herein by reference.

TECHNICAL FIELD

The technology disclosed herein belongs to a technical field related to a vehicle control system.

BACKGROUND ART

In recent years, electrification of in-vehicle devices has been markedly progressing, and motion of a vehicle has come to be controlled through electronic control.

For example, PTL 1 discloses a vehicle control system including a command controller and actuator drive controllers. The command controller calculates an operation amount command value for an in-vehicle device. Each of the actuator drive controllers controls an actuator, based on the operation command value given from the command controller. Each of the command controller and the actuator drive controllers has a failure detection function.

According to PTL 1, when the command controller has an abnormality, each actuator drive controller controls the corresponding actuator.

CITATION LIST

Patent Literature

PTL 1: Japanese Unexamined Patent Application Publication No. 2016-196295

SUMMARY OF INVENTION

Technical Problem

From the viewpoint of implementing the fail-operational capability that enables continuation of control of in-vehicle devices even when the command controller has an abnormality, all the actuator drive controllers may have the failure detection function and a calculation function (master function) as in PTL 1. However, in recent years, the use of electronic control for in-vehicle devices related to fundamental actions (driving, braking, and steering) of a vehicle, such as a steering device and a braking device, has been markedly progressing, and the number of control-target actuators reaches several hundreds. If all the controllers of the respective actuators have the failure detection function and the calculation function, the number of man-hours for system construction increases, leading to an increase in development cost.

In addition, according to PTL 1, when an abnormality occurs in the command controller, all the actuator drive controllers need to be kept in an operating state, leading to an increase in power consumption.

The technology disclosed herein has been made in view of such points, and an object thereof is to suppress an increase in cost as much as possible while implementing a high fail-operational capability.

Solution to Problem

To solve the problems described above, the technology disclosed herein is directed to a vehicle control system that includes a plurality of sensors; a central control device configured to calculate target outputs of a plurality of actuators, based on outputs of the respective sensors; and a plurality of relay devices each disposed in a communication path between the central control device and a corresponding actuator among the actuators and configured to relay a signal transmitted from the central control device, in which the central control device includes a central abnormality diagnosis unit configured to diagnose an abnormality in the central control device; the plurality of relay devices include a specific relay device that is a relay device configured to transfer a control signal from the central control device only to a specific actuator that is an actuator not related to driving control, braking control, and steering control of a vehicle among the actuators, the specific relay device being configured to output, to the specific actuator coupled to the specific relay device, one of a signal for setting the specific actuator in an operating state or a signal for setting the specific actuator in a non-operating state, in response to the central abnormality diagnosis unit detecting an abnormality in the central control device; and the specific relay device does not have a function of diagnosing an abnormality in the specific relay device.

According to this configuration, the central control device calculates the target output of each actuator. Thus, if an abnormality occurs in the central control device, each actuator may fail to operate normally. Therefore, when an abnormality occurs in the central control device, it is necessary to guide a vehicle to a neighboring shoulder of a road or a neighboring parking lot. At this time, the specific actuator not related to driving control, braking control, or steering control of the vehicle does not require continuous control in particular. That is, for example, the specific actuator just needs to be set in a state in which the safety is enhanced as a rule. According to the configuration described above, the specific relay device capable of communicating with the specific actuator outputs, to the specific actuator coupled to the specific relay device, one of the signal for setting the specific actuator in the operating state or the signal for setting the specific actuator in the non-operating state. Thus, even when an abnormality occurs in the central control device, the specific actuator can be set in the state in which the safety is enhanced. As a result, redundancy as the entire system can be implemented, and thus a high fail-operational capability can be implemented.

Since the specific actuator just needs to be set in the operating state or the non-operating, the specific relay device is not required to perform complex control. Thus, the specific relay device can be manufactured with a relatively low cost. In addition, the specific relay device does not have the function of diagnosing an abnormality in the specific relay device. The manufacturing cost of the specific relay device can be reduced also from this perspective.

Consequently, an increase in cost can be suppressed as much as possible while implementing a high fail-operational capability.

In the vehicle control system, the specific relay device may output, to the specific actuator coupled to the specific relay device, one of the signal for setting the specific actuator in the operating state or the signal for setting the specific actuator in the non-operating state, also in response to an abnormality in a state of communication between the specific relay device and the central control device.

That is, when an abnormality occurs in the state of communication between the central control device and the specific relay device because of disconnection of a communication line or the like, it becomes difficult to control the specific actuator by using the central control device regardless of whether the central control device is normal or abnormal. Thus, the specific relay device transmits the signal to the specific actuator also when an abnormality occurs in the state of communication between the central control device and the specific relay device in addition to when there is an abnormality in the central control device. Consequently, the specific actuator can be kept in a state in which at least the safety is enhanced. As a result, the fail-operational capability can be improved further.

In the vehicle control system in which the specific relay device outputs the signal to the specific actuator in response to an abnormality in the state of communication between the specific relay device and the central control device, the specific relay device may be configured to be capable of communicating with the central control device via another relay device, the other relay device may include a communication diagnosis unit configured to detect an abnormality in a state of communication between the other relay device and the central control device, and the specific relay device may output, to the specific actuator coupled to the specific relay device, one of the signal for setting the specific actuator in the operating state or the signal for setting the specific actuator in the non-operating state, in response to the communication diagnosis unit of the other relay device detecting an abnormality in the state of communication between the other relay device and the central control device.

According to this configuration, since the specific relay device need not have a function of detecting an abnormality in the state of communication between the specific relay device and the central control device, the manufacturing cost of the specific relay device can be reduced further.

In the vehicle control system, the specific actuator may include an actuator for a headlight, and in response to the central abnormality diagnosis unit detecting an abnormality in the central control device, the specific relay device configured to transmit a control signal to the headlight may transmit the control signal to the actuator for the headlight to set the headlight in a light-ON state.

That is, the safety is higher when the headlight is kept in the light-ON state as a rule. For this reason, in response to an abnormality in the central control device, the specific relay device transmits a control signal to the headlight to set the headlight in the light-ON state. Thus, an advantageous effect of a high fail-operational capability can be more appropriately exhibited.

Advantageous Effects of Invention

As described above, according to the technology disclosed herein, an increase in cost can be suppressed as much as possible by configuring the specific relay device so as not to have the function of diagnosing an abnormality in the specific relay device. In addition, the specific actuator can be kept in a relatively high safety state by configuring the specific relay device to transmit, to the specific actuator coupled to the specific relay device, one of the signal for setting the specific actuator in the operating state or the signal for setting the specific actuator in the non-operating state. Consequently, an increase in cost is suppressed as much as possible while implementing a high fail-operational capability.

BRIEF DESCRIPTION OF DRAWINGS

FIG. 3 is a block diagram illustrating a configuration of a central ECU and zone ECUs on a driver's seat side.

FIG. 4 is a block diagram illustrating control performed by each of the zone ECUs when the central ECU has an abnormality.

DESCRIPTION OF EMBODIMENTS

An exemplary embodiment will be described in detail below with reference to the drawings.

Figure 1:
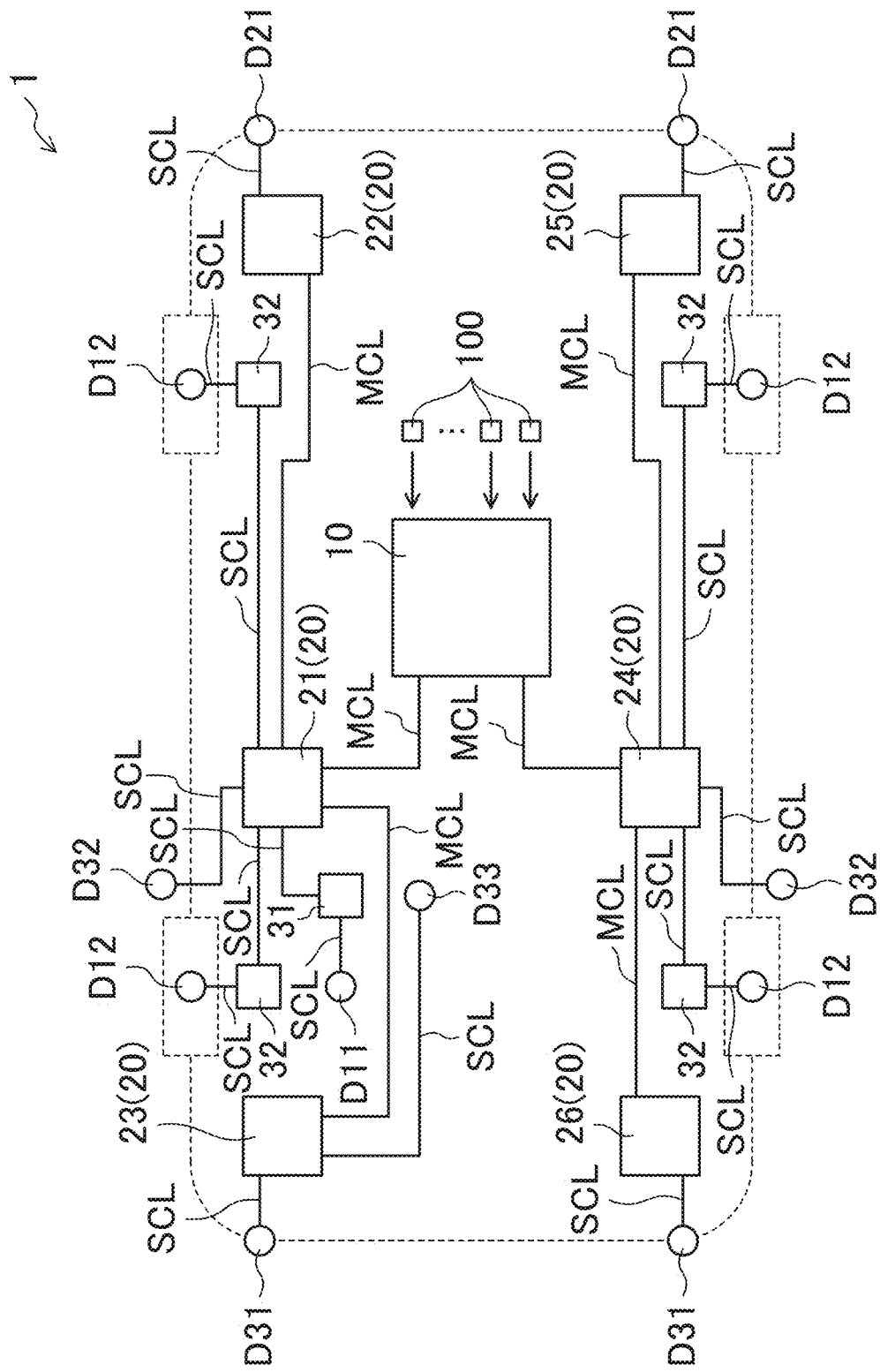
FIG. 1 is a schematic diagram illustrating part of a communication path in a vehicle equipped with a vehicle control system according to an exemplary embodiment.

FIG. 1 schematically illustrates a configuration of a communication path in a vehicle 1 equipped with a vehicle control system according to the present embodiment. This vehicle 1 is an automobile capable of performing assist driving in which the automobile travels while assisting a driver in operations and autonomous driving in which the automobile travels without operations of the driver as well as manual driving in which the automobile travels in accordance with operations of the driver. This vehicle 1 employs a by-wire system for performing electrical control, in driving control, braking control, and steering control. That is, in the vehicle 1, an operation on an accelerator pedal, an operation on a brake pedal, and an operation on a steering wheel are detected by respective sensors. In accordance with a control signal based on an output of each of the sensors, a corresponding actuator responsible for control is controlled.

As illustrated in FIG. 1, the vehicle 1 includes a plurality of actuators for causing various in-vehicle devices mounted in the vehicle 1 to operate. The in-vehicle devices include so-called body-related devices that are not related to driving, braking, and steering, which are fundamental actions of the vehicle 1. The actuators illustrated in FIG. 1 are an example of actuators mounted in the vehicle 1. The vehicle 1 may include an actuator other than the actuators illustrated in FIG. 1.

In the present embodiment, the actuators for in-vehicle devices are mainly classified into three types. A first type refers to actuators that are related to fundamental actions of the vehicle 1 and for which continuous control is to be continued even in case of emergency. A second type refers to actuators that are not related to the fundamental actions of the vehicle 1 and for which whether or not to operate is to be selected in accordance with a state of the vehicle 1 in case of emergency. A third type refers to actuators that are not related to the fundamental actions of the vehicle 1 and are just required to continue either an operating state or a non-operating state in case of emergency. Hereinafter, the actuators of the first type are referred to as fundamental actuators, the actuators of the second type are referred to as selective actuators, and the actuators of the third type are referred to as fixed actuators.

Examples of the fundamental actuators include an electric motor D11 for an electric power steering device (EPS device), a brake actuator D12 for an electric braking device, and actuators for a throttle valve and a fuel injection valve of an engine. Examples of the selective actuators include an actuator D21 for a brake lamp, and so on. Examples of the fixed actuators include an actuator D31 for a headlight, an electric motor D32 for an electric mirror, an audio apparatus D33, and so on. In the description below, when the actuators are distinguished from one another, the actuators are identified by the names of in-vehicle devices driven by the respective actuators, such as the EPS device D11 and the headlight D31. The fixed actuators such as the headlight D31, the electric mirror D32, and the audio apparatus D33 are an example of specific actuators.

The headlight D31 includes a high-beam lamp D31a and a low-beam lamp D31b, for each of which an actuator is provided.

To control operations of various actuators, the vehicle 1 includes a central ECU 10 (Electric Control Unit) that serves as a central control device, and a plurality of (six in FIG. 1) zone ECUs 20 configured to be capable of communicating with the central ECU 10.

Figure 2:
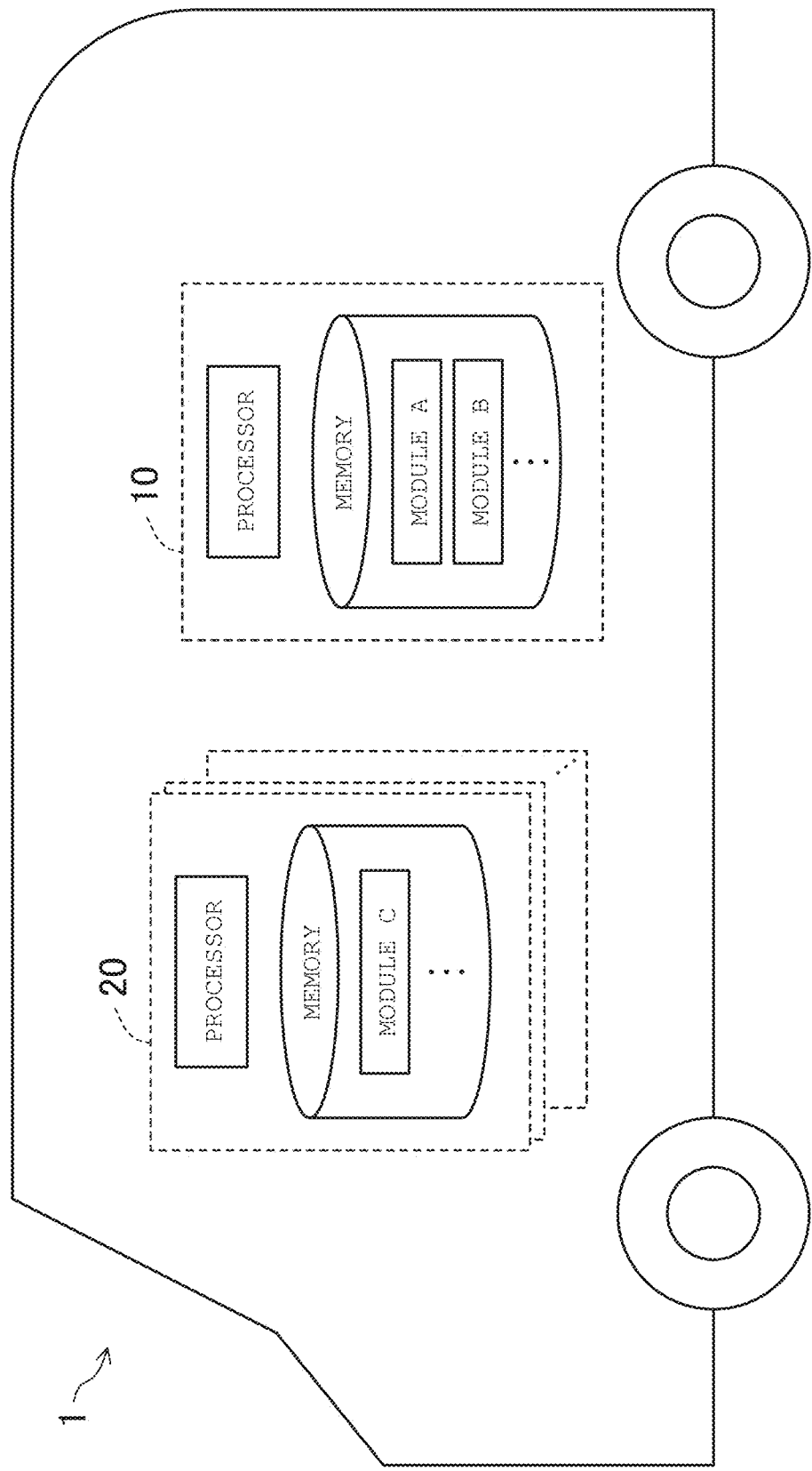
FIG. 2 is a schematic diagram illustrating the vehicle equipped with the vehicle control system.

As illustrated in FIG. 2, each of the central ECU 10 and the zone ECUs 20 is computer hardware, and specifically, includes a processor including a CPU, a memory that stores a plurality of modules, and the like. Each ECU may include a plurality of processors and a plurality of memories.

The central ECU 10 generates a control signal for controlling each actuator that causes an in-vehicle device mounted in the vehicle 1 to operate. In the vehicle 1, a control signal of each actuator is generated by the central ECU 10, and is transferred to the actuator via the zone ECU 20 and so on as a rule.

As illustrated in FIGS. 3 and 4, signals from a plurality of sensors 100 mounted in the vehicle 1 are input to the central ECU 10. The plurality of sensors 100 include, for example, a plurality of cameras 101 that are disposed at a body or the like of the vehicle and images an environment outside the vehicle; a plurality of radars 102 that are disposed at the body or the like of the vehicle and detects an object located outside the vehicle; a location sensor 103 that detects a location of the vehicle (vehicle location information) by using the global positioning system (GPS); occupant state sensors 104 each of which obtains a state of an occupant including whether the occupant is present in the vehicle; a brake pedal sensor 106 that obtains an amount by which the brake pedal is pressed by a driver of the vehicle; a steering angle sensor 105 that obtains a steering angle of the steering operated by the driver of the vehicle; and an accelerator pedal position sensor 107 that obtains an amount by which the accelerator pedal is pressed by the driver of the vehicle. The sensors 100 also include switches such as a switch of the headlights D31 and a switch of the audio apparatus D33. The sensors 101 to 107 illustrated herein are an example of sensors that input information to the central ECU 10. The present embodiment does not exclude the case where information is input to the central ECU 10 from a sensor other than the sensors 101 to 107.

The cameras 101 are arranged so that an area around the vehicle are imaged by 360 degrees in the horizontal direction. Each of the cameras 101 captures an optical image representing an environment outside the vehicle and generates image data. Each of the cameras 101 outputs the generated image data to the central ECU 10.

Similarly to the cameras 101, the radars 102 are arranged so that a detection range extends around the vehicle by 360 degrees in the horizontal direction. The type of the radars 102 is not particularly limited. For example, millimeter wave radars or infrared radars can be employed.

The occupant state sensors 104 are constituted by, for example, a vehicle-cabin camera that images the inside of the vehicle cabin and load sensors each disposed in a seat cushion. The occupant state sensors 104 output the generated image data and detection results to the central ECU 10.

When the vehicle 1 is performing manual driving or assist driving, the central ECU 10 calculates a driving force, a braking force, and a steering angle to be output by the respective actuators, based on detection values respectively obtained the accelerator pedal position sensor 107, the brake pedal sensor 106, the steering angle sensor 105, etc. The central ECU 10 generates target signals indicating the calculated driving force, braking force, and steering angle, that is, target states of the driving force, braking force, and steering angle to be achieved by the respective actuators. In particular, when the vehicle 1 is performing assist driving, the central ECU 10 takes into account target motion of the vehicle 1 described later, in calculation of the driving force, the braking force, and the steering angle.

To enable the vehicle 1 to perform autonomous driving or assist driving, the central ECU 10 receives information from the plurality of sensors 101 to 107 and calculates a route along which the vehicle 1 is to travel. The central ECU 10 determines the motion of the vehicle 1 for following the calculated route. The central ECU 10 may be, for example, a processor constituted by one or a plurality of chips, and may have an AI (Artificial Intelligence) function.

The central ECU 10 receives information from the plurality of sensors 101 to 107 and infers the environment outside the vehicle 1. The environment outside the vehicle refers to, for example, the presence or absence of an object, a road condition, and ambient brightness. The central ECU 10 integrates information such as a relative distance to the object obtained by the radars 102, with images of the outside of the vehicle captured by the cameras 101 and a recognition result of the object so as to create a 3D map representing the environment outside the vehicle.

Based on the created 3D map, the central ECU 10 creates a 2D map for use in calculation of a travel route of the vehicle 1. Based on the created 2D map, the central ECU 10 generates a travel route of the vehicle 1. The central ECU 10 determines target motion of the vehicle for following the generated travel route, and calculates a driving force, a braking force, and a steering angle for implementing the determined target motion. The central ECU 10 generates target signals indicating the calculated driving force, braking force, and steering angle, that is, target states of the driving force, braking force, and steering angle to be achieved by the respective actuators.

Based on the inferred environment outside the vehicle and the calculated travel route, the central ECU 10 generates control signals for the actuators of the body-related devices that are not related to driving control, braking control, and steering control of the vehicle 1. For example, when it is inferred that the surrounding area is dark, the central ECU 10 generates a control signal to be transmitted to the headlights D31 so as to turn on the headlights. In the environment outside the vehicle where the headlights are to be turned on, the central ECU 10 generates a signal for causing the high-beam lamp D31a to operate when there is no oncoming vehicle, and generates a signal for causing the low-beam lamp D31b to operate when there is oncoming vehicle.

Based on information obtained by the occupant state sensors 104, the central ECU 10 infers a state of an occupant in the vehicle cabin by using a trained model generated through deep learning. The state of an occupant means a health condition or emotion of the occupant.

Examples of the health condition of the occupant include being healthy, being a little tired, being in bad shape, and being less conscious. Examples of the emotion of the occupant include being fun, being OK, getting bored, being annoyed, and being uncomfortable. The central ECU 10 generates various control signals in consideration of the health condition of the occupant and the emotion of the occupant as well. For example, when the central ECU 10 infers that the temperature in the vehicle cabin is high and the occupant does not feel well, the central ECU 10 causes an air-conditioner to operate or causes a window to open.

As illustrated in FIGS. 3 and 4, the central ECU 10 includes a central abnormality diagnosis unit 11 that diagnoses an abnormality in the central ECU 10. The central abnormality diagnosis unit 11 diagnoses an abnormality in the central ECU 10 through a BIST (Built-In Self Test). The central ECU 10 notifies the zone ECUs 20 (in this case, a first zone ECU 21 and a fourth zone ECU 24 described later) of a diagnosis result obtained by the central abnormality diagnosis unit 11. The central abnormality diagnosis unit 11 is an example of the modules stored in the memory of the central ECU 10.

The zone ECU 20 is disposed in a communication path between the central ECU 10 and each actuator in each predetermined zone of the vehicle 1. Each zone ECU 20 constitutes a relay device that relays a control signal generated by the central ECU 10. In the present embodiment, the zone ECU 20 disposed in a right central portion of the vehicle may be referred to as the first zone ECU 21, the zone ECU 20 disposed in a right rear portion of the vehicle may be referred to as a second zone ECU 22, the zone ECU 20 disposed in a right front portion of the vehicle may be referred to as a third zone ECU 23, the zone ECU 20 disposed in a left central portion of the vehicle may referred to as the fourth zone ECU 24, the zone ECU 20 disposed in a left rear portion of the vehicle may be referred to as a fifth zone ECU 25, and the zone ECU 20 disposed in a left front portion of the vehicle may be referred to as a sixth zone ECU 26. The zones may be determined in any manner. If the number of zones increases or decreases, the number of zone ECUs 20 increases or decreases accordingly.

As illustrated in FIG. 1, the first zone ECU 21 is coupled to the central ECU 10 by a communication line MCL and is also coupled to the second zone ECU 22 and the third zone ECU 23 by communication lines MCL. The fourth zone ECU 24 is coupled to the central ECU 10 by a communication line MCL and is also coupled to the fifth zone ECU 25 and the sixth zone ECU 26 by communication lines MCL. That is, the first zone ECU 21 is configured to be capable of communicating with the second zone ECU 22 and the third zone ECU 23 via the communication lines MCL. On the other hand, the fourth zone ECU 24 is configured to be capable of communicating with the fifth zone ECU 25 and the sixth zone ECU 26 via the communication lines MCL. The communication lines MCL that couple the central ECU 10 and the zone ECUs 20 to each other and the communication lines MCL that couple the zone ECUs 20 to each other are constituted by, for example, ETHERNET (registered trademark) communication cables.

On the other hand, each zone ECU 20 and corresponding actuators are coupled by using communication lines SCL. The communication lines SCL are constituted by, for example, CAN communication cables. Although an illustration is omitted, each zone ECU 20 has a function of performing protocol conversion from ETHERNET (registered trademark) to CAN.

Configurations of the zone ECUs 20 will be described next. The configurations of the first zone ECU 21 to the third zone ECU 23 will now be described in detail with reference to FIG. 3.

As illustrated in FIG. 3, the first zone ECU 21 is coupled to, for example, the EPS device D11, the braking device D12 for the right front wheel, the braking device D12 for the right rear wheel, and the electric mirror D32 on the right side by using the communication lines SCL. That is, the first zone ECU 21 corresponds to a zone ECU capable of communicating with the EPS device D11 and the braking device D12. The first zone ECU 21 may also be coupled to other selective actuators or other fixed actuators although illustrations of the other actuators are omitted.

The first zone ECU 21 is configured to be capable of obtaining information from at least one sensor among the plurality of sensors. In the present embodiment, the first zone ECU 21 is configured to be capable of obtaining outputs of at least the steering angle sensor 105 and the brake pedal sensor 106.

An EPS ECU 31 that controls the EPS device D11, based on a control signal (target signal) relayed by the first zone ECU 21 is provided in a communication path between the first zone ECU 21 and the EPS device D11. A brake ECU 32 that controls the braking device D12, based on a control signal (target signal) relayed by the first zone ECU 21 is provided in a communication path between the first zone ECU 21 and the braking device D12. The first zone ECU 21 transfers information transmitted from the central ECU 10, to the EPS ECU 31 or the brake ECU 32 without any processing. As described above, since the zone ECU 20 performs protocol conversion on the control signal transmitted from the central ECU 10, the control signal itself changes.

Based on information on a target steering angle transferred from the central ECU 10, the EPS ECU 31 calculates a control amount of the EPS device D11 (such as an amount of current to be supplied to the electric motor) so that the EPS device D11 achieves the target steering angle. The EPS ECU 31 controls the EPS device D11, based on the calculated control amount. Based on information on a target braking force transferred from the central ECU 10, the brake ECU 32 calculates a control amount of the braking device D12 (such as an amount of current to be supplied to the brake actuator) so that the braking device D12 achieves the target braking force. The brake ECU 32 controls the braking device D12, based on the calculated control amount.

The first zone ECU 21 is directly coupled to the electric mirror D32 by the communication line SCL. The first zone ECU 21 transfers the information for the electric mirror D32 transmitted from the central ECU 10, to the electric mirror D32 without any processing. That is, the electric mirror D32 operates based on a control signal that is transmitted from the central ECU 10 and relayed by the first zone ECU 21 as a rule.

The first zone ECU 21 includes a zone abnormality diagnosis unit 21a that diagnoses an abnormality in the first zone ECU 21. The zone abnormality diagnosis unit 21a diagnoses an abnormality particularly in a backup calculation unit 21c described later. The zone abnormality diagnosis unit 21a diagnoses an abnormality in the first zone ECU 21 through the BIST. The first zone ECU 21 notifies the other zone ECUs 20 (in this case, the second zone ECU 22 and the third zone ECU 23) of a diagnosis result obtained by the zone abnormality diagnosis unit 21a.

The first zone ECU 21 includes a communication diagnosis unit 21b that diagnoses an abnormality in a state of communication between the first zone ECU 21 and the central ECU 10. The communication diagnosis unit 21b transmits a first test signal for communication diagnosis to the central ECU 10. The central ECU 10 that has received the first test signal from the communication diagnosis unit 21b returns, to the communication diagnosis unit 21b, a second test signal indicating that the central ECU 10 has received the first test signal. In response to successfully receiving the second test signal from the central ECU 10, the communication diagnosis unit 21b determines that the state of communication between the central ECU 10 and the first zone ECU 21 is normal. On the other hand, in response to failing to receive the second test signal from the central ECU 10, the communication diagnosis unit 21b determines that there is an abnormality in the state of communication between the central ECU 10 and the first zone ECU 21. If there is an abnormality in the state of communication between the first zone ECU 21 and the central ECU 10, the communication diagnosis unit 21b notifies the second zone ECU 22 and the third zone ECU 23 of the abnormality in the state of communication. For example, when the ignition of the vehicle 1 is switched on, the communication diagnosis unit 21b diagnoses an abnormality in the state of communication between the first zone ECU 21 and the central ECU 10. The abnormality in the state of communication is, for example, disconnection of the communication line MCL.

The communication diagnosis unit 21b also diagnoses an abnormality in a state of communication between the first zone ECU 21 and the EPS ECU 31 and an abnormality in a state of communication between the first zone ECU 21 and the brake ECU 32. The communication diagnosis unit 21b diagnoses the state of communication between the first zone ECU 21 and the EPS ECU 31 and the state of communication between the first zone ECU 21 and the brake ECU 32 by using a method similar to that used for the diagnosis of the state of communication between the first zone ECU 21 and the central ECU 10. In response to the communication diagnosis unit 21b detecting an abnormality in the state of communication between the first zone ECU 21 and the EPS ECU 31 or an abnormality in the state of communication between the first zone ECU 21 and the brake ECU 32, the first zone ECU 21 reports the abnormality to the occupant of the vehicle 1. Examples of the reporting method include a method such as sounding a buzzer or providing a lamp that reports a communication abnormality of an electronic device on a meter panel and causing the lamp to blink. The communication diagnosis unit 21b diagnoses an abnormality in the state of communication between the first zone ECU 21 and the EPS ECU 31 and an abnormality in the state of communication between the first zone ECU 21 and the brake ECU 32, for example, when the ignition of the vehicle 1 is switched on.

The first zone ECU 21 includes the backup calculation unit 21c capable of calculating target outputs of the actuators (the EPS device D11 and the braking device D12 in this case) coupled to the first zone ECU 21. When the central ECU 10 is normal and the state of communication between the central ECU 10 and the first zone ECU 21 is normal, the backup calculation unit 21c does not calculate the target outputs. On the other hand, when there is an abnormality in the central ECU 10 or there is an abnormality in the state of communication between the central ECU 10 and the first zone ECU 21, the backup calculation unit 21c calculates the target outputs of the specific actuators. Based on at least one of information obtained by the sensors and input to the first zone ECU 21 and information input from the other zone ECU 20, the backup calculation unit 21c calculates the target outputs of the specific actuators. The backup calculation unit 21c transmits target signals of the target outputs of the specific actuators to the EPS ECU 31 and the brake ECU 32.

The backup calculation unit 21c is configured to be capable of outputting an ON signal for keeping the electric mirror in the fully open state. When the central ECU 10 is normal and the state of communication from the central ECU 10 to the first zone ECU 21 is normal, the backup calculation unit 21c does not output the ON signal to the electric mirror D32. On the other hand, when there is an abnormality in the central ECU 10 or there is an abnormality in the state of communication from the central ECU 10 to the first zone ECU 21, the backup calculation unit 21c outputs the ON signal to the electric mirror D32. Thus, when there is an abnormality in the central ECU 10 or there is an abnormality in the state of communication from the central ECU 10 to the first zone ECU 21, the electric mirror is kept in the fully open state.

As illustrated in FIG. 3, the second zone ECU 22 is coupled to, for example, the brake lamp D21 on the right side by the communication line SCL. The second zone ECU 22 is configured to be capable of obtaining information from at least one sensor among the plurality of sensors. In the present embodiment, the second zone ECU 22 is configured to be capable of obtaining an output of at least the brake pedal sensor 106. The second zone ECU 22 is not coupled to the fundamental actuators but is coupled to the selective actuators and the fixed actuators although illustrations of the other actuators are omitted.

The second zone ECU 22 is directly coupled to the brake lamp D21 by the communication line SCL. The second zone ECU 22 transfers the information for the brake lamp D21 transmitted from the central ECU 10, to the brake lamp D21 without any processing. That is, the brake lamp D21 operates based on a control signal that is transmitted from the central ECU 10 and relayed by the second zone ECU 22 as a rule.

The second zone ECU 22 includes a backup determination unit 22a capable of determining whether to cause the brake lamp D21 to operate. When the central ECU 10 is normal and the state of communication from the central ECU 10 to the second zone ECU 22 is normal, the backup determination unit 22a does not make determination as to whether to cause the brake lamp D21 to operate. On the other hand, when there is an abnormality in the central ECU 10 or there is an abnormality in the state of communication from the central ECU 10 to the second zone ECU 22, the backup determination unit 22a determines whether to cause the brake lamp D21 to operate. Based on at least one of information obtained by the sensor and input to the second zone ECU 22 and information input from the other zone ECU 20, the backup determination unit 22a determines whether to cause the brake lamp D21 to operate. The backup determination unit 22a transmits a control signal for causing the brake lamp D21 to operate, to the brake lamp D21. In accordance with the notification from the first zone ECU 21, the second zone ECU 22 recognizes an abnormality in the central ECU 10 and an abnormality in the state of communication between the central ECU 10 and the first zone ECU 21.

The second zone ECU 22 does not have a function of diagnosing an abnormality in the second zone ECU 22 such as the zone abnormality diagnosis unit 21a.

As illustrated in FIG. 3, the third zone ECU 23 is coupled to, for example, the headlight D31 on the right side by the communication lines SCL. In the present embodiment, the outputs from the sensors are not input to the third zone ECU 23. The third zone ECU 23 is coupled neither to the fundamental actuators nor to the selective actuators but is coupled only to the fixed actuators although illustrations of the other actuators are omitted.

The third zone ECU 23 is directly coupled to the headlight D31 by the communication lines SCL. The third zone ECU 23 transfers the information for the headlight D31 transmitted from the central ECU 10, to the headlight D31 without any processing. That is, the headlight D31 operates based on a control signal that is transmitted from the central ECU 10 and relayed by the third zone ECU 23 as a rule.

The third zone ECU 23 includes a fixed signal output unit 23a that outputs, to a fixed actuator (the headlight D31 or the audio apparatus D33 in this case) coupled to the third zone ECU 23, one of a signal for setting the fixed actuator in an operating state or a signal for setting the fixed actuator in a non-operating state.

Specifically, the fixed signal output unit 23a outputs an ON signal for keeping the high-beam lamp D31a of the headlight D31 in a light-ON state. When the central ECU 10 is normal and the state of communication from the central ECU 10 to the third zone ECU 23 is normal, the fixed signal output unit 23a does not output the ON signal to the high-beam lamp D31a. On the other hand, when there is an abnormality in the central ECU 10 or there is an abnormality in the state of communication from the central ECU 10 to the third zone ECU 23, the fixed signal output unit 23a outputs the ON signal to the high-beam lamp D31a. Thus, when there is an abnormality in the central ECU 10 or there is an abnormality in the state of communication between the central ECU 10 and the third zone ECU 23, the high-beam lamp D31a is kept in the light-ON state.

On the other hand, when an abnormality occurs in the central ECU 10 or an abnormality occurs in the state of communication from the central ECU 10 to the third zone ECU 23 while the low-beam lamp D31b is ON, the fixed signal output unit 23a outputs an OFF signal for keeping the low-beam lamp D31b in a light-OFF state. That is, when an abnormality occurs in the central ECU 10 or an abnormality occurs in the state of communication from the central ECU 10 to the third zone ECU 23, the high-beam lamp D31a is set in the light-ON state but the low-beam lamp D31b is set in the light-OFF state regardless of whether there is an oncoming vehicle.

The fixed signal output unit 23a is configured to be capable of outputting an OFF signal for keeping the audio apparatus D33 in an OFF state. When the central ECU 10 is normal and the state of communication from the central ECU 10 to the third zone ECU 23 is normal, the fixed signal output unit 23a does not output the OFF signal to the audio apparatus D33. On the other hand, when there is an abnormality in the central ECU 10 or there is an abnormality in the state of communication from the central ECU 10 to the third zone ECU 23, the fixed signal output unit 23a outputs the OFF signal to the audio apparatus D33. Thus, when there is an abnormality in the central ECU 10 or there is an abnormality in the state of communication between the central ECU 10 and the third zone ECU 23, the audio apparatus D33 is kept in the OFF state.

The third zone ECU 23 does not have a function of diagnosing an abnormality in the third zone ECU 23 such as the zone abnormality diagnosis unit 21a.

Thus, the third zone ECU 23 corresponds to a specific relay device.

The fourth zone ECU 24 to the sixth zone ECU 26 are also configured according to substantially the same design methods as those of the first zone ECU 21 to the third zone ECU 23, respectively. That is, the zone ECU 20, such as the fourth zone ECU 24, to which the fundamental actuators (the braking device D12 in this case) are coupled includes the zone abnormality diagnosis unit 21a, the communication diagnosis unit 21b, and the backup calculation unit 21c as in the first zone ECU 21. The zone ECU 20, such as the fifth zone ECU 25, to which no fundamental actuator is coupled but the selective actuators (the brake lamp D21 in this case) are coupled includes the backup determination unit 22a as in the second zone ECU 22. The zone ECU 20, such as the sixth zone ECU 26, to which only the fixed actuators (the headlight D31 in this case) are coupled includes the fixed signal output unit 23a as in the third zone ECU 23.

The zone abnormality diagnosis unit 21a, the communication diagnosis unit 21b, and the backup calculation unit 21c are an example of the modules stored in the memory of the first zone ECU 21 and the memory of the fourth zone ECU 24. The backup determination unit 22a is an example of the modules stored in the memory of the second zone ECU 22 and the memory of the fifth zone ECU 25. The fixed signal output unit 23a is an example of the modules stored in the memory of the third zone ECU 23 and the memory of the sixth zone ECU 26.

In the present embodiment, the central ECU 10 calculates the target output of each actuator. Thus, when an abnormality occurs in the central ECU 10, each actuator may fail to operate normally. Therefore, when an abnormality occurs in the central ECU 10, it is necessary to guide the vehicle 1 to a neighboring shoulder of a road or a neighboring parking lot. To guide the vehicle 1 to the shoulder of a road or the like, at least the fundamental actuators of the vehicle 1 just need to be controllable.

Accordingly, in the present embodiment, the backup calculation unit 21c is provided in the zone ECU 20 (for example, the first zone ECU 21) capable of communicating with the fundamental actuators to make the fundamental actuators controllable even when an abnormality occurs in the central ECU 10.

FIG. 4 illustrates signals transmitted from the first to third zone ECUs 21 to 23 when the central abnormality diagnosis unit 11 detects an abnormality in the central ECU 10.

When the central abnormality diagnosis unit 11 detects an abnormality in the central ECU 10, the central abnormality diagnosis unit 11 outputs an abnormality notification for notifying the first zone ECU 21 of the abnormality in the central ECU 10. The first zone ECU 21 that has received the abnormality notification notifies the second zone ECU 22 and the third zone ECU 23 that the first zone ECU 21 has received the abnormality notification. The first zone ECU 21 to the third zone ECU 23 do not transfer, to the respective actuators, the signals from the central ECU 10.

The first zone ECU 21 then calculates, with the backup calculation unit 21c, target outputs of the EPS device D11 and the braking device D12, based on the information obtained by the sensors and input to the first zone ECU 21. The backup calculation unit 21c transmits target signals of the target outputs of the EPS ECU 31 and the brake ECU 32. The first zone ECU 21 also outputs, with the backup calculation unit 21c, the ON signal to the electric mirror D32 to keep the electric mirror in the fully open state.

The second zone ECU 22 determines, with the backup determination unit 22a, whether to cause the brake lamp D21 to operate, based on information obtained by the sensor and input to the second zone ECU 22. The backup determination unit 22a transmits the ON signal to the brake lamp D21 when causing the brake lamp D21 to operate.

The third zone ECU 23 outputs, with the fixed signal output unit 23a, the ON signal to the high-beam lamp D31a of the headlight D31 to keep the high-beam lamp D31a in the light-ON state. When the low-beam lamp D31b of the headlight D31 is in the light-ON state, the third zone ECU 23 outputs, with the fixed signal output unit 23a, to the OFF signal to the low-beam lamp D31b to keep the low-beam lamp D31b in the light-OFF state. The third zone ECU 23 also outputs, with the fixed signal output unit 23a, the OFF signal to the audio apparatus D33 to keep the audio apparatus D33 in the OFF state.

As described above, by changing the configuration of the zone ECU 20 in accordance with the type of the actuator coupled to the zone ECU 20, the number of man-hours for system construction can be suppressed and thus development cost can be reduced while implementing the fail-operational capability of the control system. That is, if all the zone ECUs 20 are configured to include the backup calculation unit 21c as in the first zone ECU 21, the development cost increases. For this reason, the calculation function such as the backup calculation unit 21c is desirably omitted for the zone ECUs 20 to which only the actuators that are not related to the fundamental actions of the vehicle 1 and are controllable only with the ON/OFF signals, such as the headlight D31, are coupled. On the other hand, if all the zone ECUs 20 are configured to include only the fixed signal output unit 23a as in the third zone ECU 23, the EPS device D11 can no longer be continuously controlled and consequently the fail-operational capability of the control system decreases. Thus, with the configuration according to the present embodiment, the development cost can be suppressed while implementing the fail-operational capability of the control system.

In the present embodiment, the zone ECUs 20 that are not coupled to the fundamental actuators, such as the second zone ECU 22 and the third zone ECU 23, do not have a self-diagnosis function. That is, for the selective actuators and the fixed actuators, either the operating state or the non-operating state just needs to be selectable when the central ECU 10 has an abnormality. Thus, complex control is not required. Therefore, even if the zone ECUs 20 such as the second zone ECU 22 and the third zone ECU 23 do not have a function of diagnosing an abnormality therein, no particular problem is caused from the viewpoint of the fail-operational capability. For this reason, the zone ECUs 20 such as the second zone ECU 22 and the third zone ECU 23 are configured so as not to have the function of diagnosing an abnormality therein. Thus, the manufacturing cost of the zone ECUs 20 can be reduced.

Accordingly, in the present embodiment, the vehicle control system includes the plurality of sensors 100; the central ECU 10 configured to calculate target outputs of a plurality of actuators, based on outputs of the respective sensors 100; and the plurality of relay devices (for example, the zone ECUs 20) each disposed in a communication path between the central ECU 10 and a corresponding actuator among the actuators and configured to relay a signal transmitted from the central ECU 10, in which the central ECU 10 includes the central abnormality diagnosis unit 11 configured to diagnose an abnormality in the central ECU 10; the plurality of relay devices include a specific relay device (for example, the third zone ECU 23) that is a relay device configured to transfer a control signal from the central ECU 10 only to a fixed actuator (for example, the headlight D31) that is an actuator not related to driving control, braking control, and steering control of a vehicle among the actuators, the specific relay device being configured to output, to the fixed actuator coupled to the specific relay device, one of a signal for setting the fixed actuator in an operating state or a signal for setting the fixed actuator in a non-operating state, in response to the central abnormality diagnosis unit 11 detecting an abnormality in the central ECU 10; and the specific relay device does not have a function of diagnosing an abnormality in the specific relay device. Thus, even when an abnormality occurs in the central ECU 10, the fixed actuator can be kept in a state in which the safety is enhanced. As a result, redundancy as the entire system can be implemented, and thus a high fail-operational capability can be implemented. In addition, since the fixed actuator just needs to be set in the operating state or the non-operating state, the specific relay device is not required to perform complex control. Thus, the specific relay device can be manufactured with a relatively low cost. In addition, the specific relay device does not have the function of diagnosing an abnormality in the specific relay device. The manufacturing cost of the specific relay device can be reduced also from this perspective In addition, in the present embodiment, the specific relay device outputs, to the fixed actuator coupled to the specific relay device, one of the signal for setting the fixed actuator in the operating state or the signal for setting the fixed actuator in the non-operating state, also in response to an abnormality in the state of communication between the specific relay device and the central ECU 10. That is, when an abnormality occurs in the state of communication between the central ECU 10 and the specific relay device because of disconnection of a communication line between the central ECU 10 and the specific relay device or the like, a first specific relay device needs to control the fixed actuators and a second specific relay device needs to control the selective actuators regardless of whether the central ECU 10 is normal or abnormal. Thus, with the configuration described above, the fail-operational capability can be improved further.

In addition, in the present embodiment, the specific relay device is configured to be capable of communicating with the central ECU 10 via another relay device (for example, the first zone ECU 21); the other relay device includes the communication diagnosis unit 21b configured to detect an abnormality of a state of communication between the other relay device and the central ECU 10; in response to the communication diagnosis unit 21b of the other relay device detecting an abnormality in the state of communication between the other relay device and the central ECU 10, the specific relay device outputs, to the fixed actuator coupled to the specific relay device, one of the signal for setting the fixed actuator in the operating state or the signal for setting the fixed actuator in the non-operating state. Thus, the specific relay device need not have a function of detecting an abnormality in the state of communication between the specific relay device and the central ECU 10. Therefore, the manufacturing cost of the specific relay device can be reduced further.

The technology disclosed herein is not limited to the embodiment described above and may be altered within a scope not departing from the gist of the claims.

For example, in the embodiment described above, the zone ECUs (the first zone ECU 21 to the third zone ECU 23) on the driver's seat side and the zone ECUs (the fourth zone ECU 24 to the sixth zone ECU 26) on the passenger's seat side are coupled to one another only through the central ECU 10. However, the configuration is not limited this. For example, the second zone ECU 22 and the fifth zone ECU 25 may be coupled to each other by a communication line and the third zone ECU 23 and the sixth zone ECU 26 may be coupled to each other by a communication line, so that a loop communication network may be formed. According to this configuration, it becomes easier for each zone ECU 20 to obtain information from the central ECU 10 and information from the other zone ECUs 20. Thus, the redundancy of the control system can be improved, and consequently the fail-operational capability can be improved.

In the embodiment described above, the backup calculation unit 21c is provided in the zone ECU 20 (specifically, the first zone ECU 21). The configuration is not limited to this. The backup calculation unit 21c may be provided in the EPS ECU 31 and the brake ECU 32. In this case, the EPS ECU 31 and the brake ECU 32 desirably have a function of diagnosing an abnormality therein.

In the embodiment described above, in the third zone ECU 23, the one fixed signal output unit 23a outputs the control signal in both cases where there is an abnormality in the central ECU 10 and where there is an abnormality in the state of communication from the central ECU 10 to the third zone ECU 23. The configuration is not limited to this. A fixed signal output unit that outputs a control signal when there is an abnormality in the central ECU 10 and a fixed signal output unit that outputs a control signal when there is an abnormality in the state of communication may be separately provided.

In the embodiment described above, when the backup calculation unit 21c is provided in the zone ECU 20, the backup calculation unit 21c transmits a control signal to the fixed actuator such as the electric mirror D32.

However, the configuration is not limited to this. The zone ECU coupled to the fixed actuator may include the fixed signal output unit, and the fixed signal output unit may output a signal to the fixed actuator coupled to the specific zone ECU.

In the embodiment described above, only the first zone ECU 21 and the fourth zone ECU 24 include the communication diagnosis unit 21b. However, the configuration is not limited to this, and each zone ECU 20 may include the communication diagnosis unit 21b.

In the embodiment described above, a vehicle capable of performing autonomous driving is set as the target vehicle. However, the target vehicle need not be the vehicle capable of performing autonomous driving.

The embodiment described above is merely an example and is not to be construed as limiting the scope of the present disclosure. The scope of the present disclosure is defined by the claims, and all modifications and alterations within a scope of the equivalents of the claims are within the scope of the present disclosure.

INDUSTRIAL APPLICABILITY

The technology disclosed herein is useful for improving the fail-operational capability of a vehicle control system.

REFERENCE SIGNS LIST

10 central ECU (central control device)
11 central abnormality diagnosis unit
20 zone ECU (relay device)
23 third zone ECU (specific relay device)
23a fixed signal output unit
D31 actuator (specific actuator) for headlight
D32 electric motor (specific actuator) for electric mirror
D33 actuator (specific actuator) for audio apparatus

The invention claimed is:

1. A vehicle control system comprising:
a plurality of sensors;
a central control device configured to calculate target outputs of a plurality of actuators, based on outputs of the respective sensors; and
a plurality of relay devices each disposed, separately from the central control device, in a communication path between the central control device and a corresponding actuator among the actuators and configured to relay a signal transmitted from the central control device, wherein
the central control device includes a central abnormality diagnosis circuit configured to diagnose an abnormality in the central control device,
the plurality of relay devices include a specific relay device configured to transfer a control signal from the central control device only to a specific actuator that is an actuator not related to driving control, braking control, and steering control of a vehicle among the actuators,
the specific relay device includes:
a first specific relay device, to which a signal from the sensors is not input, and
a second specific relay device, to which a signal from the sensors is input,
the first specific relay device is configured to output, to the specific actuator coupled to the first specific relay device, a preset one of a signal for setting the specific actuator in an operating state or a signal for setting the specific actuator in a non-operating state, in response to the central abnormality diagnosis circuit detecting an abnormality in the central control device,
the second specific relay device is configured to determine, based on information obtained by the sensors, whether to set the specific actuator coupled to the second specific relay device in the operating state or in the non-operating state, in response to the central abnormality diagnosis circuit detecting an abnormality in the central control device, and
neither the first nor the second specific relay device has a function of diagnosing an abnormality in the respective specific relay devices.

2. The vehicle control system according to claim 1, wherein
the first specific relay device outputs, to the specific actuator coupled to the first specific relay device, a preset one of the signal for setting the specific actuator in the operating state or the signal for setting the specific actuator in the non-operating state, also in response to an abnormality in a state of communication between the first specific relay device and the central control device.

3. The vehicle control system according to claim 2, wherein
each of the first and second specific relay devices is configured to be capable of communicating with the central control device via another relay device,
the other relay device includes a communication diagnosis circuit configured to detect an abnormality in a state of communication between the other relay device and the central control device, and
the first specific relay device outputs, to the specific actuator coupled to the first specific relay device, a preset one of the signal for setting the specific actuator in the operating state or the signal for setting the specific actuator in the non-operating state, in response to the communication diagnosis circuit of the other relay device detecting an abnormality in the state of communication between the other relay device and the central control device.

4. The vehicle control system according to claim 1, wherein
the specific actuator includes an actuator for a headlight, and
in response to the central abnormality diagnosis circuit detecting an abnormality in the central control device, the first specific relay device configured to transmit a control signal to the actuator for the headlight transmits the control signal to the headlight to set the headlight in a light-ON state.

5. The vehicle control system according to claim 2, wherein
the specific actuator includes an actuator for a headlight, and
in response to the central abnormality diagnosis circuit detecting an abnormality in the central control device, the first specific relay device configured to transmit a control signal to the actuator for the headlight transmits the control signal to the headlight to set the headlight in a light-ON state.

6. The vehicle control system according to claim 3, wherein
the specific actuator includes an actuator for a headlight, and
in response to the central abnormality diagnosis circuit detecting an abnormality in the central control device, the first specific relay device configured to transmit a control signal to the actuator for the headlight transmits the control signal to the headlight to set the headlight in a light-ON state.

* * * * *